United States Patent
Boldt et al.

(10) Patent No.: US 9,952,248 B2
(45) Date of Patent: Apr. 24, 2018

(54) SPEED SENSOR RING

(71) Applicant: Danfoss Power Solutions G.m.b.H & Co. OHG, Neumünster (DE)

(72) Inventors: Momme Boldt, Schleswig-Holstein (DE); Markus Reimer, Klein Nordende (DE); Howe Gripp, Schleswig-Holstein (DE); Bernd Hames, Henstedt-Ulzburg (DE)

(73) Assignee: Danfoss Power Solutions G.m.b.H. & Co. OHG, Deumünster (DE)

( * ) Notice: Subject to any disclaimer, the term of this patent is extended or adjusted under 35 U.S.C. 154(b) by 32 days.

(21) Appl. No.: 15/262,123

(22) Filed: Sep. 12, 2016

(65) Prior Publication Data

US 2017/0108526 A1    Apr. 20, 2017

(30) Foreign Application Priority Data

Oct. 14, 2015   (DE) .................. 10 2015 117 498

(51) Int. Cl.
*G01P 3/487* (2006.01)

(52) U.S. Cl.
CPC .................... *G01P 3/487* (2013.01)

(58) Field of Classification Search
CPC ................ G01P 1/02; G01P 3/48; G01P 3/44
See application file for complete search history.

(56) References Cited

U.S. PATENT DOCUMENTS

| | | | |
|---|---|---|---|
| 4,835,505 A | 5/1989 | Hattori et al. | |
| 2003/0122539 A1 | 7/2003 | Heimann, Jr. et al. | |
| 2005/0035758 A1* | 2/2005 | Waszkowski | B60T 8/171 324/207.25 |
| 2009/0280948 A1* | 11/2009 | Fuhrer | F16H 59/38 475/331 |
| 2013/0160669 A1* | 6/2013 | Turmeau | B61F 5/28 105/218.1 |

FOREIGN PATENT DOCUMENTS

| | | |
|---|---|---|
| DE | 4230043 A1 | 3/1994 |
| DE | 19513669 A1 | 12/1995 |
| DE | 694 11 657 T2 | 3/1999 |
| DE | 102009053916 A1 | 5/2011 |

* cited by examiner

*Primary Examiner* — Jermele M Hollington
*Assistant Examiner* — Alvaro Fortich
(74) *Attorney, Agent, or Firm* — McCormick, Paulding & Huber LLP

(57) ABSTRACT

The invention relates to a signal inducing device (1, 9, 11, 12, 18, 19, 20), comprising a first material (2, 3, 13, 14) and a second material (4, 16). The first material (2, 3, 13, 14) and the second material (4, 16) show a different magnetic behavior. The first material (2, 3, 13, 14) and the second material (4, 16) are arranged in a way that the resulting magnetic behavior of the signal inducing device (1, 9, 11, 12, 18, 19, 20) varies over a magnetic interaction surface (5, 10) of the signal inducing device (1, 9, 11, 12, 18, 19, 20). The signal inducing device (1, 9, 11, 12, 18, 19, 20) is designed in a way that the magnetic interaction surface (5, 10) shows an essentially smooth surface, in particular with respect to the standard moving direction of the magnetic interaction surface (5, 10).

20 Claims, 4 Drawing Sheets

SPEED SENSOR RING

CROSS REFERENCE TO RELATED APPLICATION

Applicant hereby claims foreign priority benefits under U.S.C. § 119 from German Patent Application No. 102015117498.7 filed on Oct. 14, 2015, the content of which is incorporated by reference herein.

TECHNICAL FIELD

The invention relates to a signal inducing device, comprising a first material and a second material, wherein the first material and the second material show a different magnetic behaviour, and wherein the first material and the second material are arranged in a way that the resulting magnetic behaviour of the signal inducing device varies over a magnetic interaction surface of the signal inducing device.

BACKGROUND

Signal inducing devices, sometimes referred to as speed sensor rings are frequently used for a plethora of technical devices. As an example, they are used to determine the speed, and sometimes even a position, of a device that is turning with respect to a (main) part of a machine being at rest.

An example for this is a turning axle of a vehicle (where wheels are attached to) or a crankshaft of a combustion engine.

Due to the wide and frequent use of such speed sensor rings, a huge variety of speed sensor rings is known in the state of the art which all work reasonably well.

Sometimes, however, problems arise in some special technical applications that are not known in the context of other technical applications (although they sometimes seem to be closely related with each other).

As an example, toothed wheels made of a soft magnetic material are frequently used as a signal inducing device for a magnetic sensor, where the combination of the toothed wheel and the sensor are used for determining the turning speed of an axle that is connected to a wheel. Such an arrangement is used for determining the speed of a vehicle and—as a more elaborate example—as a sensor arrangement for an anti-lock system for breaking (which relates to speed information as well). While such an arrangement is working well for a lot of applications, problems can occur, if the device is used for hydraulic systems. Here, the presence of oil near the signal inducing device is almost unavoidable. Sometimes, the toothed wheel has to be arranged in an area of the vehicle, where the toothed wheel is partially or even fully immersed in hydraulic oil. Now, the problem arises that the teeth and the gaps between the teeth produce a hydraulic friction in the oil bath. In particular at higher turning speeds of the axle/toothed wheel, a significant loss of mechanical energy (and consequently an appropriately high generation of thermal energy) will occur when using such a toothed wheel. Of course, this adverse behaviour is to be avoided.

For such applications, an alternative solution has been suggested, where an elastic band is used as a base for a signal inducing device. At regular intervals, a magnetic coating is arranged of the base material. Afterwards, a thin coating is applied to the outer surface of the device to make the surface as smooth as possible. A disadvantage of this solution is that still some roughness exists on the outside. Furthermore, the device is quite cost intensive to produce. Yet another disadvantage is the use of magnetic material (hard magnetic material to be exact). When the material is magnetised, it is prone to agglomeration of soft or hard magnetic materials. However, such materials can be around in form of small metallic particles in the hydraulic oil, where the small metallic particles can be present due to wear of metallic components. This can even lead to a destruction of the sensor. It is easy to understand that this is not what one is looking for.

SUMMARY

Therefore, the object of the invention is to propose a signal inducing device that shows a varying magnetic behaviour over a magnetic interaction surface of the signal inducing device that is improved over signal inducing devices that are known in the state of the art. A signal inducing device according to claim 1 solves this object.

It is suggested to design a signal inducing device, comprising a first material and a second material, wherein the first material and a second material show a different magnetic behaviour and wherein the first material and the second material are arranged in a way that the resulting magnetic behaviour of the signal inducing device varies over a magnetic interaction surface of the signal inducing device in a way that the signal inducing device is designed in a way that the magnetic interaction surface shows an essentially smooth surface, in particular with respect to the standard moving direction of the magnetic interaction surface. Albeit more materials can be used, it is preferred if exactly two different materials are used for the signal inducing device and/or in the vicinity of the magnetic interaction surface of a signal inducing device. The magnetic behaviour can vary in various ways. As an example, a different magnetic behaviour with respect to the underlying physical effect of the respective material can be envisaged. To elucidate this, the first material can be a paramagnetic substance or a diamagnetic substance, while the second material can be a ferromagnetic substance. However, different combinations are possible as well. In particular, when it comes to ferromagnetic substances, a differentiation between hard magnetic substances (presumably showing a permanent magnetism and/or not showing a permanent magnetism per se) and soft magnetic substances can be made. Due to the limited magnetic effect of paramagnetic and diamagnetic substances, both can be considered to be (essentially) non-magnetic substance (in particular within the context of the present application and/or invention). Another differentiation between different magnetic behaviour can be made based on the strength of the respective effect. As an example, both first and second material can be a ferromagnetic substance, while the first material is a soft magnetic material and the second material is a hard magnetic material (or the like). It is even possible, that the first and the second material are taken from the group, showing the same "underlying physical effect", while they differ in "strength of the respective effect". As an example, both first and second material can be soft magnetic material. However, it is possible that the first material shows a lower (relative) magnetic susceptibility with respect to the second material (or vice versa). Furthermore, it should be noted that "first material" and "second material" cannot only be understood in the sense that different "pure" substances are used. Of course, it is possible that one or both of the materials involved are composites comprising a mixture of different materials (for example an alloy or a ceramic substance). In effect, it is even possible that the first material and the second material are to be understood to be a mixture of the same components, but the ratio of the different components is different. The "resulting magnetic behaviour" can be particularly understood as the "combined magnetic effect" at a certain location with respect to the signal inducing device, in particular with respect to the magnetic interaction surface. Typically, said certain location is a position, where a sensor (in particular a magnetic sensor) will be typically arranged when employing the signal inducing device in its intended place in a more complex machine (including the respective sensor). It is to be noted that said certain position (i.e. where typically a sensor is placed) will usually move with respect to the signal inducing device (or to be more exact: typically the signal inducing device will move with respect to the certain position; in particular a position where a sensor is placed). The certain position where the measurement is taken (in particular location of a sensor) is typically considered with respect to a reference frame of the more complex machinery, the signal inducing device is used in. In this reference frame, the certain position (of the sensor) is at rest. As an example: if the signal inducing device (and presumably the sensor) is used in a vehicle, the reference frame of the vehicle is typically moving with respect to factory building, of course. Therefore, both the signal inducing device and the sensor of a vehicle are typically moved with respect to the factory building, while the sensor is resting with respect to the vehicle's body. Furthermore, the resulting magnetic behaviour of the signal inducing device can change in essentially every thinkable way. Not only a (absolute) value like the magnetic susceptibility and/or the (absolute) strength of a permanent magnetic field might vary, but also additionally and/or alternatively a direction of a susceptibility, a direction of a permanent magnetic field and so on. According to the present suggestion, the signal inducing device is designed in a way that the magnetic interaction surface shows an essentially smooth surface, in particular with respect to the standard moving direction of the magnetic interaction surface. The smooth surface is usually to be understood with respect to fluid dynamic forces that occur when moving the essentially smooth surface with respect to the fluid the essentially smooth surface (magnetic interaction surface) comes into contact when the signal inducing device is used in its intended machinery. As an example, when the signal inducing device is partially immersed in hydraulic oil, when it is arranged in the gearbox of a forklift truck (to give an example), the magnetic interaction surface will come into contact with air (at ambient air pressure; typically at around approximately 1 bar air pressure, depending on weather conditions and altitude, of course) and hydraulic oil (at the same pressure level as the air "above"). Therefore, an essentially smooth surface should generate comparatively small viscous forces when being in contact with air and hydraulic oil, when the signal inducing device is moving in its standard moving direction. Therefore, dimples that are used for generating a lotus effect (to give an example) can be considered to be "an essentially smooth surface" in the present context, albeit from a strictly geometrical viewpoint, this is of course not a smooth surface. Therefore, the expression of "an essentially smooth surface" with respect to the standard moving direction of the magnetic interaction surface might be considered to be a surface, showing low forces (in particular viscous forces or dampening forces) when moving with respect to a fluid (or even more fluids) the magnetic interaction surface of the signal inducing device is designed to be in contact with (in particular under standard operating conditions of the signal inducing device). In general, a fluid in the sense of this application can be a gas, a liquid or a mixture of both. In particular, it is even possible that some solid particles are contained (like smoke=a gas, containing solid particles or a suspension=a liquid, containing solid particles). Consequently, it shall be allowed to use both definitions (and presumably slight variations and/or preferred embodiments thereof) alternatively, in combination and/or interchangeably. As an additional remark, it should be mentioned that the signal inducing device can have more than one standard moving direction of the magnetic interaction surface. A typical example is the use of a signal inducing device on the axle of a driving wheel of a forklift truck. The forklift truck can of course be driven in two directions (forward and backward direction). So the signal inducing device can be designed in a way, that it shows an essentially smooth surface when being moved in both directions (i.e. forward and backward). Using the example of a forklift truck, it is preferred if the smooth surface shows the same quality/quantity with respect to smoothness in both directions (since a forklift truck is typically used in the forward and the backward direction at similar speeds and for comparable distances). Of course, it is also possible that a different quality/quantity of this surface smoothness can be present for different directions. As an example, a car is typically used in the forward direction. In this direction the smoothness should be very high. The backward direction is however only used very infrequently and the quality of the smoothness in this direction can be very low without causing any significant adverse effects. Nevertheless, even this direction can be somehow considered, so that the "quality/quantity of the essentially smooth surface" can be weighted in the different directions that are typically employed. Only for clarification: it is of course possible that the signal inducing device can be operated in even more directions; nevertheless the standard application will be a movement in a forward and a backward direction (thus, these are the directions that have to be considered at least at a higher degree).

It is preferred if the first material and the second material of the signal inducing device are arranged alternately along the magnetic interaction surface of the signal inducing device, in particular along a standard moving direction of the magnetic interaction surface. Some kind of blocks, following each other, can be arranged on an outer circumference of a ring-like structure, for example. Using the suggested design, a particularly profound change of the resulting magnetic behaviour at a point of measurement (for example a position of the sensor) can be realised very effectively. Of course, the distances and dimensions of the materials employed (in connection with the "degree and/or direction of change of magnetic behaviour" of the material used) should be chosen in a way that they comply with the dimensions of the signal inducing device and/or the position of the point of measurement and the like. This way, a particularly simple and efficient design can be realised.

Another preferred embodiment can be realised if essentially all exposed surfaces of the signal inducing device show an essentially smooth surface, in particular with respect to the standard moving direction of the signal inducing device. Such a design normally does not counteract with manufacturing processes and/or typically does not increase the overall cost of the signal inducing device. However, using the suggested design, the signal inducing device can be used more universally and in particular can be used in connection with even strongly changing operating conditions. As an example, when using a signal inducing device of the suggested design, the signal inducing device can be used in connection with different fluid levels in the gearbox of a forklift truck, when used under the aforementioned conditions. This way, the device can be used more universally.

Furthermore, it is suggested to design the signal inducing device in a way that the magnetic interaction surface is designed as a closed surface, in particular as a rounded surface, preferably as a circular surface and/or in that the signal inducing device is designed as a ring-like object and/or a wheel-like object. Using such a design, the signal inducing device will typically show low counteracting viscous forces by its very design. Furthermore, such a shape will comply with typical requirements the signal inducing device is typically used in connection with. Since the suggested shapes are somewhat according to a usual design for signal inducing devices, the proposed signal inducing device can be used as a "snap-in" solution, which can increase the acceptance of the device.

Furthermore, it is suggested to design the signal inducing device in a way that the signal inducing device is essentially symmetrical, preferably mirror symmetrical, in particular with respect to geometry and/or with respect to magnetic behaviour and/or in particular with respect to a plane that lies normal to the standard moving direction of the signal inducing device and/or the standard moving direction of the magnetic interaction surface. Such a design complies with standard requirements of signal inducing devices and is generally preferred. In particular, the respective device can be used as a "snap-in" solution, increasing the acceptance of the presently proposed signal inducing device. Furthermore, the respective design can lower viscous forces and/or can increase the smoothness of the respective surfaces, which is of course advantageous.

Is further suggested to design the signal inducing device in a way that bulges and/or notches are arranged along an exposed surface of the signal inducing device, preferably along the magnetic interaction surface, wherein preferably said bulges and/or notches are arranged in a way that they show an essentially smooth surface with respect to the standard moving direction of the signal inducing device and/or of the magnetic interaction surface. Such a design is particularly preferred, since the signal inducing device can be adapted very well to essentially any geometrical requirements of the machinery, the signal inducing device is intended to be used in. It is to be noted that available space is typically rare in nowadays machinery, in particular if the respective machinery is designed to be portable/mobile (for example when constructing a vehicle like a car or a forklift truck). Despite of the degree of freedom of the geometrical shape, the respective surfaces still can show a high degree of smoothness and consequently show no (or little, if any) increase of viscous forces when being employed.

Another preferred design can be realised if the signal inducing device is designed in a way that the first material comprises a soft magnetic material and/or a hard magnetic material and/or a material that is taken from the group comprising iron, iron alloys, steel and ferrites and/or in a way that the second material comprises a non-magnetic material and/or comprises a material that is taken from the group comprising resin, plastics, plastomers, nickel, nickel alloys, copper and copper alloys. First experiments have shown that such a design is particularly advantageous. In particular, if a material is used that shows no (or little) permanent magnetism, an agglomeration of metallic particles around the signal inducing device can be avoided, which is particularly advantageous. Furthermore, if a (soft and/or hard) magnetic material is used in combination with a non-magnetic material, a particular profound change of the resulting magnetic behaviour (at the sensor's position) can be realised along the magnetic interaction surface of the signal inducing device. Therefore, a simpler and less sensitive sensor can be employed. Furthermore, if iron, steel or the like is used as a "base substance" of the signal inducing device, a particularly stable signal inducing device can be realised, since metals or the like typically show a high strength and are comparatively cheap and/or are easily available. Furthermore, they are standard material for a lot of technical applications.

It is furthermore suggested to design the signal inducing device in a way that the first material and/or the second material show a bar-like configuration along the magnetic interaction surface, preferably over the full extent across the magnetic interaction surface. First experiments have shown that such a design shows a particularly advantageous behaviour and is still comparatively easy to realise. The expression "bar-like configuration" can be interpreted in a broad sense. In particular, cubical-shaped or ashlar-formed shapes are possible. However, different forms are possible as well. In particular, a circular or elliptical cross-section, a (double-) dovetail shaped cross-section, a triangular-shaped cross-section and/or a rhomboid-shaped cross-section (along one or two planes, where those planes are preferably perpendicular to each other, and where one plane lies preferably essentially parallel to the plane of the ring/plate of the signal inducing device) are possible. In particular a (double-) dovetail-shaped form can be advantageous for improving the mechanical stability of the signal inducing device.

It is further preferred to design the signal inducing device in a way that at least one of the first and second material is arranged as a toothed rack and/or in that at least one of the first and second material is arranged as a filler material for indentations, in particular for the spaces between the teeth of a toothed rack. In case a wheel-like structure is used for the signal inducing device, a toothed wheel can be used and/or the spaces between the teeth of a toothed wheel can be used. First experiments have shown that this way a particularly cheap and yet very stable signal inducing device, showing advantageous effects can be realised. In particular, using the suggested device, it is usually possible to use standard components that are already around and are readily available. The teeth of the toothed rack can have essentially any shape. In particular, a rectangular, a sawtooth-like and/or a triangular shaped toothed rack and/or a toothed rack showing "rounded teeth" is possible.

It is further suggested to design the signal inducing device in a way that the first material and the second material are connected to each other by means of a force-fit connection, by means of a form-locking connection, by means of a positive substance locking connection or combinations thereof (combining two of the aforementioned connections or even all three). As a positive substance locking connection, gluing, soldering or welding can be used, as an example. It should be noted that all of the connections mentioned (i.e. force-fit connection and/or form-locking connection and/or positive substance locking connection) cannot be only established with the first material and the second material involved. Instead, it is also possible to use a third material for performing at least part of the "connection work". As an example, if a toothed wheel that is possibly made a soft magnetic material (like iron or an iron alloy) is used as the "start" of the signal inducing device, the gaps between the teeth of the tooth wheel can be later on filled by a plastic material (or another preferably non-magnetic material). These fillings can hold in place by adhesive forces (using glue for example) and/or by forming somehow an inlay connection as it is known from dentistry. Later on, some additional fixation like a resilient coating, covering both the first and the second material, can be applied, reinforcing the overall device.

Another preferred embodiment can be realised if the first material and/or the second material are spaced evenly and/or in that the first material and/or the second material are spaced in a special encoding arrangement and/or in that the signal inducing device, in particular the first material and/or the second material is/are designed and/or is/are arranged in a way that the magnetic interaction surface produces an essentially binary signal. Choosing an embodiment according to the suggestion, the signal inducing device can be used for typical requirements. For example, the signal inducing device can be used for a simple measurement of speed (for example rotational speed of an axle). However, using a special encoding, it is also possible to determine the position of the signal inducing device (which can be an axle of a wheel or a crankshaft of an engine or the like). Typically, it is preferred if the resulting signal is of a binary type. This is not only because the resulting logic is usually easier to implement. In addition, if the signal is of a binary type, aggregations of dirt, alterations of the devices or the like usually do not play a relevant role (where in case of the value of an analogue signal is used, where the value contains some information, this will usually result in "bad readings").

Furthermore a signal inducing arrangement is proposed, comprising a signal inducing device of the aforementioned type and a sensor device. In particular, the signal inducing device and the sensor device are combined in a "sensible way". In particular, this usually means that in the present proposed device, the sensor will read the (varying) magnetic behaviour of the signal inducing device along a magnetic interaction surface thereof. Furthermore, the arrangement and the positions of both devices will be chosen in a way that a good signal will be produced by the sensor and/or in a way that no adverse mechanical effects (for example an impact or the like) will occur, at least under standard operating conditions.

In particular, the signal inducing device and/or the signal inducing arrangement according to the previous description can be used for any kind of rotating device. In particular, the rotating device can be an axle, a crankshaft, a wheel, a wheel support, a spindle device and/or a shaft of essentially any type of machinery. The machinery can be (to name some examples) a motor, a combustion engine, a machine tool, an electric motor, an electric generator, a fluid working machine, a fluid pump, a fluid motor (where the fluid can be hydraulic oil and/or water in both cases), a turbine, a carriage device, an undercarriage device, a generator device, a wind generator device or the like. The signal inducing device and/or the signal inducing arrangement can be used for stationary machinery, land craft (including on-road use, off-road use and/or rail-bound use), watercraft, aircraft and/or spacecraft. In particular vehicles like cars, trucks, buses, vehicles comprising hydraulic installations, forklift trucks, tractors, farm machinery and the like are possible.

BRIEF DESCRIPTION OF THE DRAWINGS

Further advantages, features, and objects of the invention will be apparent from the following detailed description of the invention in conjunction with the associated drawings, wherein the drawings show.

DETAILED DESCRIPTION

Figure 1:
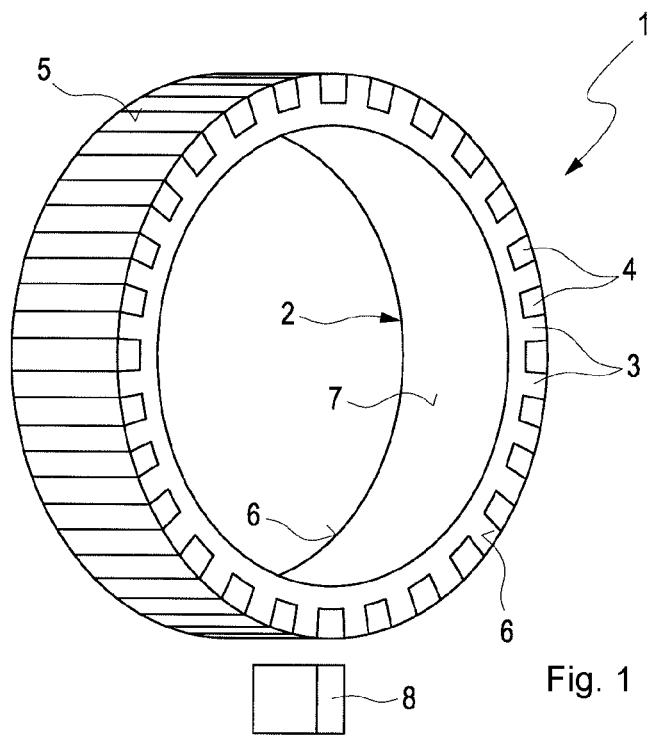
FIG. 1 is a first embodiment of a speed sensor ring in a schematic perspective view.
Figure 2A:
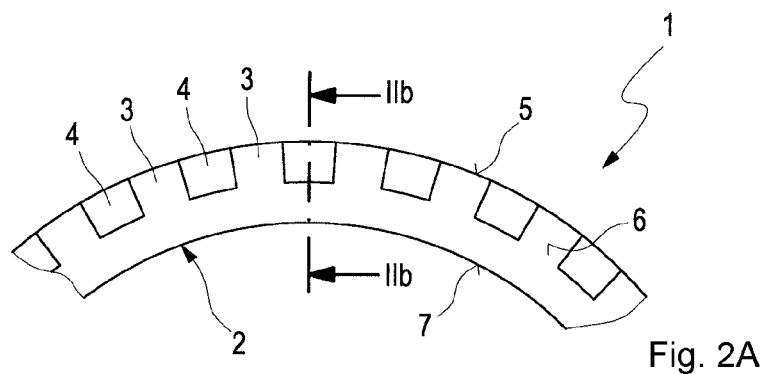
FIG. 2A shows the first embodiment of a speed sensor ring in a partial view.

In FIG. 1, a possible first embodiment of a speed sensor ring 1 is shown in a schematic perspective view. The speed sensor ring 1 can vary in size significantly depending on the application. However, in the presently shown embodiment, the speed sensor ring has a width of 1.5 cm (axial dimension) a diameter of 15 cm (outer radial dimension) and a thickness of the ring structure of 1.5 cm. Further details of the design of the speed sensor ring 1 can be seen in FIG. 2, where a partial side view and a cross-sectional view through the speed ring 1 are shown.

This speed sensor ring 1 comprises a base body 2 that has the basic design of a tooth wheel with essentially rectangular teeth 3 (of course, the "tooth wheel" is presently not a wheel, but a ring, so the "inner plate" is missing; however, the speed sensor ring 1 could also have the design of a wheel). The rectangular teeth 3 have a circumferential length (seen when going along the radius) of presently 3 mm. The distance between two teeth 3 is presently 5 mm. The gaps between two consecutive teeth 3 are filled with a filling 4. The fillings 4 are dimensioned in a way that an essentially smooth surface (outer circumferential surface 5) is established, when the speed sensor ring 1 is turned (for example when being placed on a driving axle of a forklift truck). This way, a turning movement of the speed sensor ring 1 will not induce (significant) friction/decelerating (viscous) forces when the speed sensor ring 1 is (partially) immersed in hydraulic oil, for example.

To be more exact, the outer circumferential surface 5 and both sidewalls 6 of the speed sensor ring 1 have to have a smooth surface. In the presently shown embodiment, even the inner circumferential surface 7 of the speed sensor ring 1 is designed with a smooth surface. However, this can be different as well. As an example, the inner circumferential surface 7 can show some recesses or protrusions (ridges or ditches) that are extending in an axial direction. These recesses or protrusions can engage corresponding protrusions/recesses that are arranged on the outer circumference of an axle to form a form-fit connection between the axle and the speed sensor ring. If this is designed in an appropriate way, no "rough surfaces" will be "visible" from the outside (for example for hydraulic oil).

However, if the present design of a smooth inner circumferential surface 7 is used, normally the handling and the assembly of the speed sensor ring 1 will be particularly simple. An attachment on an axle can be done using glue, for example.

In the presently shown example, the fillings 4 will hold in place between the rectangular teeth 3 using glue. In particular, if the turning speed of the speed sensor ring 1 is not excessive, such a method of attachment will usually be sufficient to counter tangential forces induced by turning the speed sensor ring 1. The thickness of the fillings 4 (and therefore the depths of the gaps between two teeth 3) is presently 2.5 mm.

In the presently shown example, the base body 2 of the speed sensor ring 1 is made of a soft magnetic material, presently an iron alloy or steel. On the contrary, the fillings 4 (presently made of a plastic material) are made of a non-metal material. Therefore, a quite distinct difference between the magnetic behaviour of both materials 3, 4 along the outer circumferential surface 5 (magnetic interaction surface), and thus of the resulting magnetic behaviour in the vicinity of the outer circumferential surface 5 of the speed sensor ring 1 is present.

It should be noted, that not only a plastic material can be used as a non-magnetic material, but also different materials, in particular even non-magnetic metals (like aluminium, copper, brass) could be used as well.

An advantage of using non-magnetic material together with soft magnetic material is that no (strong) permanent magnetic field will be generated by the speed sensor ring 1. This is very advantageous, because small metallic particles (some smaller steel chips due to wear or the like) that might be around will not be picked up by the speed sensor ring (missing magnetic forces). Therefore, an "aggregation of surface roughness with time" can be effectively avoided.

Nevertheless, it should be noted as well that the speed sensor ring 1 could be (partially) manufactured from magnetisable material (hard magnetic material) and/or magnetised material (permanent magnets).

As it is schematically indicated in FIG. 1, a magnetic sensor 8 can be placed near the outer circumferential surface 5 (magnetic interaction surface of the signal inducing device), so that it will pick up changes in the resulting magnetic behaviour of the speed sensor ring 1 along its outer circumferential surface 5. This way, the turning speed of the speed sensor ring 1 can be determined.

It should be noted that in the present example, the spaces between two consecutive teeth 3 and/or two consecutive fillings 4 are identical along the circumference of the speed sensor ring 1. Therefore, additional means for determining a turning direction and/or the position of the device the speed sensor ring 1 is used for (for example of an axle) has to be determined by different means.

Alternatively, a design for the speed sensor ring 1 could be used, where different sizes of the teeth 3/fillings 4 are used in a way that a distinct pattern is formed, so that the turning direction and/or the position of the speed sensor ring 1 can be determined by said pattern by means of the sensor 8.

Figure 2B:
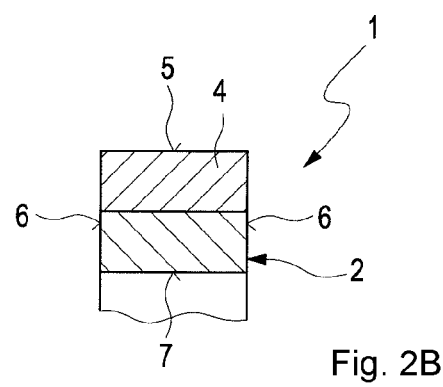
FIG. 2B shows the first embodiment of the speed sensor ring in a partial cross-sectional view.

As can be seen particularly from FIG. 2b, the axial extent of the fillings 4 is chosen in a way that the fillings 4 extend over the whole axial dimension of the speed sensor ring. Of course, different designs are possible as well, like a sidewall, generated by the base body 2 on one or on both sides 6 of the speed sensor ring 1. Likewise, the fillings 4 could have an axial (and/or radial) extension that will interconnect the fillings 4 along one or both sidewalls 6 and/or along the outer circumferential surface 5.

Figure 3A:
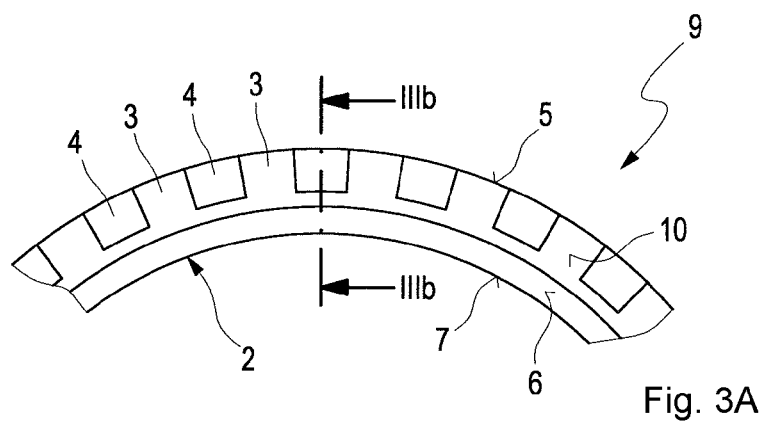
FIG. 3A is a second embodiment of a speed signal ring in a partial view from the side.
Figure 3B:
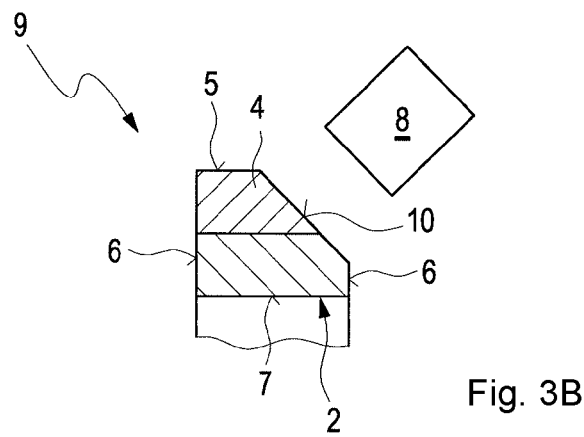
FIG. 3B shows the second embodiment of the speed signal ring in a partial cross-sectional view.

In FIG. 3, a second embodiment of a speed sensor ring 9 is shown. In FIG. 3, a partial side view (FIG. 3a) and a cross-section (FIG. 3b) through the speed sensor ring 9 is shown.

As can be seen, the speed sensor ring 9 has a tapered surface 10 that is arranged between one of the sidewalls 6 (right sidewall in FIG. 3b) and the outer circumferential surface 5 of the speed sensor ring 9.

In the presently shown embodiment, the tapered surface 10 is arranged and dimensioned in a way that near one of the sidewalls 6 (right sidewall in FIG. 3b), a "protrusion" of the base body 2 will be present in the axial direction of the speed sensor ring 9. Therefore, it in a top view, looking onto the outer circumferential surface 5 of the speed sensor ring 9, a "band" of the base body 2 will be visible near the respective sidewall 6.

The presently shown second embodiment of the speed sensor ring 9 can be advantageous for certain arrangements. In particular, it might be the case that due to limited available space and/or due to geometrical considerations, the sensor 8 has to be arranged somewhat "sideways" from the speed sensor ring 9. This arrangement of the sensor 8 is schematically shown in FIG. 3b.

As it is clear from FIG. 3b, the magnetic interaction surface can now be considered to be the tapered surface 10. However, the outer circumferential surface 5 can still be used as a magnetic interaction surface. It is even possible, that a sensor 8 is placed in the vicinity of a sidewall 6, so that even the sidewalls 6 (or one of them) can be considered to be a magnetic interaction surface.

Figure 4:
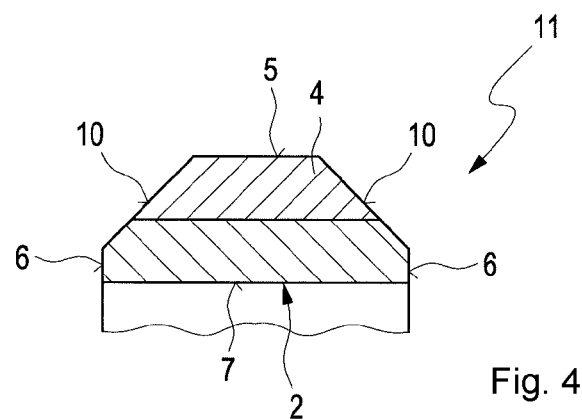
FIG. 4 is a third embodiment of a speed sensor ring in a cross-sectional view.

Only for completeness, in FIG. 4 a third embodiment of a speed sensor ring 11 is shown. Here, both sidewalls 6 show a tapered surface analogous to the second embodiment of a speed sensor ring 9 (as seen in FIG. 3).

In FIG. 5, a set of additional three exemplary embodiments of a speed sensor ring 18, 19, 20 is shown in two different sectional views, respectively. The first view (top row of FIG. 5) is a view onto the outer circumferential surface of the respective speed sensor ring 18, 19, 20, while the second view (bottom row of FIG. 5) is a sectional cross-section through the respective speed sensor ring 18, 19, 20.

Figure 5C:
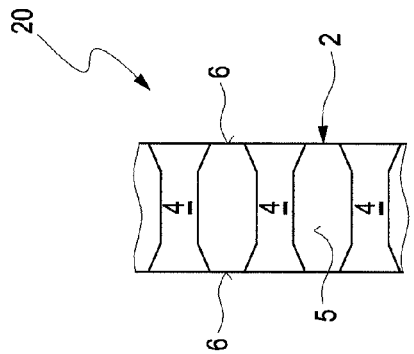
FIG. 5C shows another embodiment of a speed sensor ring in a sectional top view and a sectional cross-sectional view, respectively.
Figure 5C:
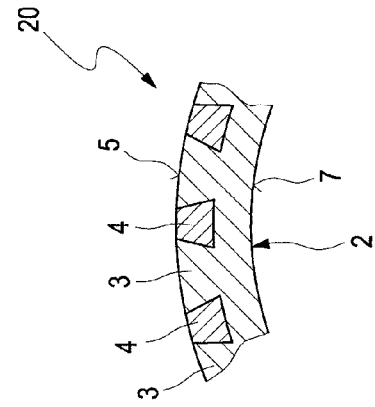
Figure 5B:
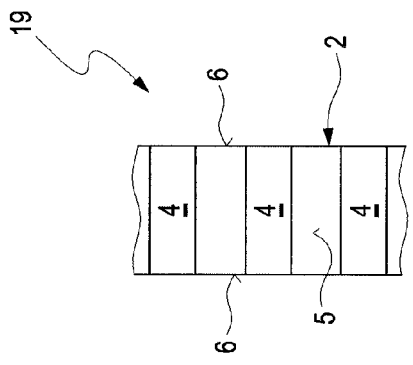
FIG. 5B shows another embodiment of a speed sensor ring in a sectional top view and a sectional cross-sectional view, respectively.
Figure 5B:
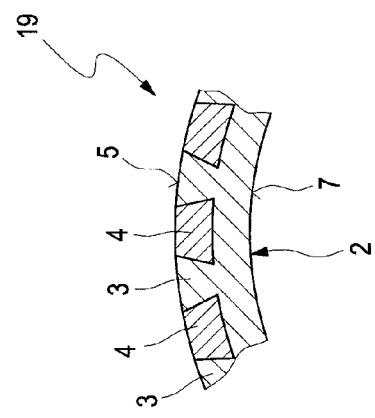
Figure 5A:
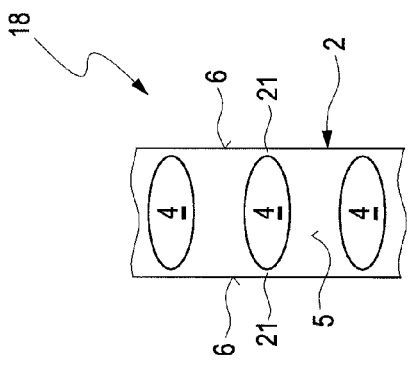
FIG. 5A shows another embodiment of a speed sensor ring in a sectional top view and a sectional cross-sectional view, respectively.
Figure 5A:
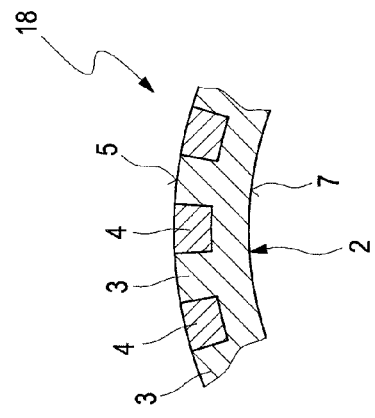

In the speed sensor ring 18, as shown in FIG. 5a, the respective fillings 4 have an elliptical shape when seen from atop (outer circumferential surface 5 of the speed sensor ring 18), while some thin walls 21 are comprised of the "base material" of the speed sensor ring 18 remain on the sideward surface of the speed sensor ring 18. Therefore, when viewed from the side, one would see a continuous, uninterrupted surface of the speed sensor ring 18. When seen in a cross-sectional view (cross-sectional plane parallel to the plane of the speed sensor ring 18), however, one can see the presently rectangular shaped fillings 4 (also a dove-tail shape or the like would be possible as well). The cross-sectional view is depicted in the lower row of FIG. 5a.

In FIG. 5b, the speed sensor ring 19 has rectangular fillings 4, when seen from atop (outer circumferential surface 5 of the speed sensor ring 19). In the cross-sectional view, however, one can see a dove-tail shape of the fillings 4. Thus, a form-locking connection between the fillings 4 and the base material of the speed sensor ring 19 is realized. Even at very high turning speeds of the speed sensor ring 19, the fillings 4 will hold well in place due to this form-locking connection. Insertion of the fillings 4 can be made by pressure moulding methods, or by sliding in the respective fillings 4 from the side.

In FIG. 5c, the fillings 4 of the speed sensor ring 20 not only have a dove-tail shape, when seen in the cross-sectional view, but also a double-dovetail shape, when seen from atop (outer circumferential surface 5 of the speed sensor ring 20). This way, the fillings 4 hold very well in place, even with respect to sideward forces. The fillings 4 can be placed by pressure moulding methods, for example.

Figure 6A:
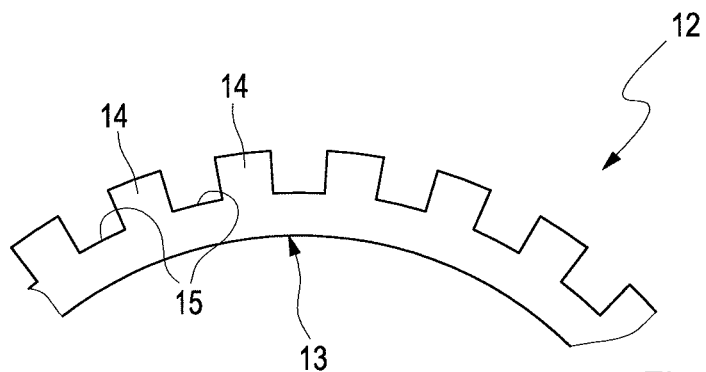
FIG. 6A is a first step of a possible production scheme for a speed sensor ring.
Figure 6B:
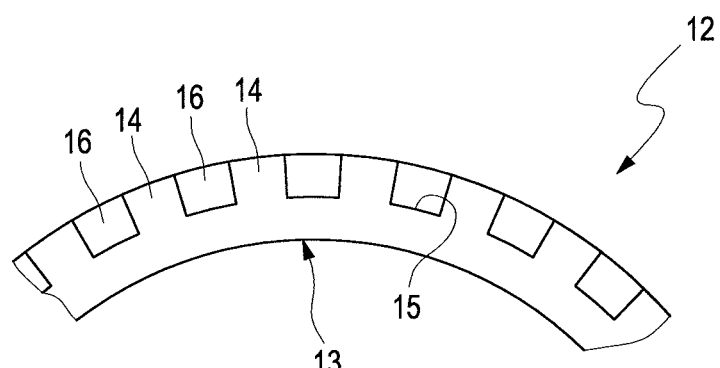
FIG. 6B shows a second step of the production scheme of FIG. 6A.
Figure 6C:
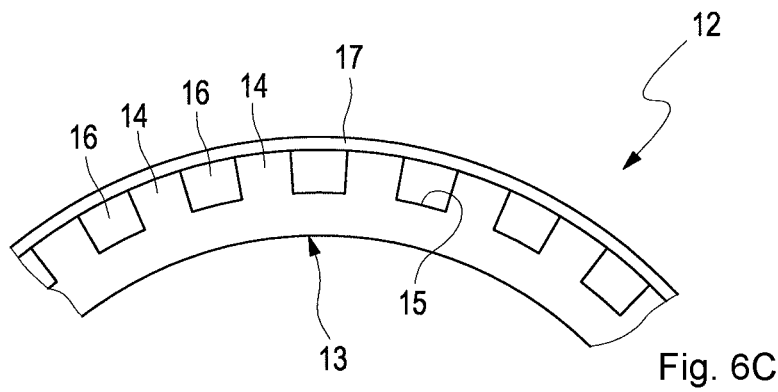
FIG. 6C shows an optional third step of the production scheme of FIG. 6A.

Finally, in FIG. 6 possible manufacturing steps for producing a speed sensor ring 12 are shown. The speed sensor ring 12 can be of a design according to one of the already presented embodiments (i.e. a speed sensor ring 1 according to the first embodiment, a speed sensor ring 9 according to the second embodiment and/or a speed sensor ring 11 according to the third embodiment and/or a speed sensor ring 18, 19, 20 according to one of the additional three exemplary embodiments) and/or of a different design. In particular, the speed sensor ring can be a wheel-like structure as well (then, one could even talk about a speed sensor disc or a speed sensor wheel).

First of all (FIG. 6a), a base body 13 will be produced, showing a number of (presently) evenly spaced teeth 14 (presently of a rectangular design; this could be different as well, however; in particular one has to rethink slightly if one of the additional three embodiments of speed sensor rings 18, 19, 20 is employed), where between two consecutive teeth 14, a gap 15 is arranged (presently of a rectangular design as well).

Subsequently (FIG. 6b) the gaps 15 between the teeth 14 are filled with a filler material 16 in a way that essentially smooth surfaces will be generated (outer circumferential surface and/or sidewalls of the speed sensor ring 12). As an example, the fillings 16 can be assembled by pressure moulding or the like.

Finally, as an optional step (see FIG. 6c), a coating 17 can be applied to the outer circumferential surface and/or to one or both sidewalls. This way, some (typically minor) roughness of the outer surfaces can be reduced, minimised and/or (essentially) avoided. Furthermore, the stability of the speed sensor ring 12 might be increased as well by providing a coating 17.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A signal inducing device, comprising a first material and a second material, wherein the first material and the second material show a different magnetic behaviour, wherein the first material and the second material are arranged in a way that the resulting magnetic behaviour of the signal inducing device varies over a magnetic interaction surface of the signal inducing device, wherein the signal inducing device is designed in a way that the magnetic interaction surface shows an essentially smooth surface, in particular with respect to the standard moving direction of the magnetic interaction surface.

2. The signal inducing device according to claim 1, wherein said first material and said second material are arranged alternately along the magnetic interaction surface of the signal inducing device, in particular along a standard moving direction of the magnetic interaction surface.

3. The signal inducing device according to claim 1, wherein essentially all exposed surfaces of the signal inducing device show an essentially smooth surface, in particular with respect to the standard moving direction of the signal inducing device.

4. The signal inducing device according to claim 1, wherein the magnetic interaction surface is designed as a closed surface, in particular as a rounded surface, preferably as a circular surface and/or in that the signal inducing device is designed as a ring-like object and/or a wheel-like object.

5. The signal inducing device according to claim 1, wherein the signal inducing device is essentially symmetrical, preferably mirror symmetrically, in particular with respect to geometry and/or with respect to magnetic behaviour, and/or in particular with respect to a plane that lies normal to the standard moving direction of the signal inducing device and/or the standard moving direction of the magnetic interaction surface.

6. The signal inducing device according to claim 1, wherein bulges and/or notches are arranged along an exposed surface of the signal inducing device, preferably along the magnetic interaction surface, wherein preferably said bulges and/or notches are arranged in a way that they show an essentially smooth surface with respect to the standard moving direction of the signal inducing device and/or the magnetic interaction surface.

7. The signal inducing device according to claim 1, wherein the first material comprises a soft magnetic material and/or a hard magnetic material and/or a material that is taken from the group comprising iron, iron alloys, steel and ferrites and/or characterized in that the second material comprises a non-magnetic material and/or comprises a material that is taken from the group comprising resin, plastics, plastomers, nickel, nickel alloys, copper and copper alloys.

8. The signal inducing device according to claim 1, wherein the first material and/or the second material show a bar-like configuration along the magnetic interaction surface, preferably over the full extent across the magnetic interaction surface.

9. The signal inducing device according to claim 8, wherein at least one of the first and second material is arranged as a toothed rack and/or in that at least one of the first and second material is arranged as a filler material for indentations, in particular for the spaces between the teeth of a toothed rack.

10. The signal inducing device according to claim 1, wherein the first material and the second material are connected to each other by means of a force-fit connection and/or a form-locking connection and/or a positive substance locking connection.

11. The signal inducing device according to claim 1, wherein the first material and/or the second material are spaced evenly and/or in that the first material and/or the second material are spaced in a special encoding arrangement and/or in that the signal inducing device, in particular the first material and/or the second material is/are designed and/or arranged in a way that the magnetic interaction surface produces an essentially binary signal.

12. A signal inducing arrangement, comprising a sensor device and a signal inducing device according to claim 1.

13. The signal inducing device according to claim 2, wherein essentially all exposed surfaces of the signal inducing device show an essentially smooth surface, in particular with respect to the standard moving direction of the signal inducing device.

14. The signal inducing device according to claim 2, wherein the magnetic interaction surface is designed as a closed surface, in particular as a rounded surface, preferably as a circular surface and/or in that the signal inducing device is designed as a ring-like object and/or a wheel-like object.

15. The signal inducing device according to claim 3, wherein the magnetic interaction surface is designed as a closed surface, in particular as a rounded surface, preferably as a circular surface and/or in that the signal inducing device is designed as a ring-like object and/or a wheel-like object.

16. The signal inducing device according to claim 2, wherein the signal inducing device is essentially symmetrical, preferably mirror symmetrically, in particular with respect to geometry and/or with respect to magnetic behaviour, and/or in particular with respect to a plane that lies normal to the standard moving direction of the signal inducing device and/or the standard moving direction of the magnetic interaction surface.

17. The signal inducing device according to claim 3, wherein the signal inducing device is essentially symmetrical, preferably mirror symmetrically, in particular with respect to geometry and/or with respect to magnetic behaviour, and/or in particular with respect to a plane that lies normal to the standard moving direction of the signal inducing device and/or the standard moving direction of the magnetic interaction surface.

18. The signal inducing device according to claim 4, wherein the signal inducing device is essentially symmetrical, preferably mirror symmetrically, in particular with respect to geometry and/or with respect to magnetic behaviour, and/or in particular with respect to a plane that lies normal to the standard moving direction of the signal inducing device and/or the standard moving direction of the magnetic interaction surface.

19. The signal inducing device according to claim 2, wherein bulges and/or notches are arranged along an exposed surface of the signal inducing device, preferably along the magnetic interaction surface, wherein preferably said bulges and/or notches are arranged in a way that they show an essentially smooth surface with respect to the standard moving direction of the signal inducing device and/or the magnetic interaction surface.

20. The signal inducing device according to claim 3, wherein bulges and/or notches are arranged along an exposed surface of the signal inducing device, preferably along the magnetic interaction surface, wherein preferably said bulges and/or notches are arranged in a way that they show an essentially smooth surface with respect to the standard moving direction of the signal inducing device and/or the magnetic interaction surface.

* * * * *

UNITED STATES PATENT AND TRADEMARK OFFICE
CERTIFICATE OF CORRECTION

PATENT NO. : 9,952,248 B2
APPLICATION NO. : 15/262123
DATED : April 24, 2018
INVENTOR(S) : Mom Boldt et al.

Page 1 of 1

It is certified that error appears in the above-identified patent and that said Letters Patent is hereby corrected as shown below:

On the Title Page

Item (73) Under the Assignee, with regard to the city "Deumünster," please note that the city name should correctly appear as "Neumünster."

Signed and Sealed this
Ninth Day of October, 2018

Andrei Iancu
*Director of the United States Patent and Trademark Office*